(12) United States Patent
Fujii et al.

(10) Patent No.: US 11,957,074 B2
(45) Date of Patent: Apr. 16, 2024

(54) WORK VEHICLE

(71) Applicant: KUBOTA CORPORATION, Osaka (JP)

(72) Inventors: Yuto Fujii, Sakai (JP); Justin McCallister, Cleveland, GA (US); Hideki Aoki, Duluth, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/563,594

(22) Filed: Dec. 28, 2021

(65) Prior Publication Data

US 2022/0117157 A1 Apr. 21, 2022

Related U.S. Application Data

(63) Continuation of application No. 16/430,880, filed on Jun. 4, 2019, now Pat. No. 11,246,263.

(51) Int. Cl.
A01D 34/90 (2006.01)
B25F 5/00 (2006.01)

(52) U.S. Cl.
CPC ............ *A01D 34/905* (2013.01); *B25F 5/006* (2013.01); *A01D 2034/907* (2013.01)

(58) Field of Classification Search
CPC ............ A01D 34/905; A01D 2034/907; A01D 34/824; B25F 5/006
See application file for complete search history.

(56) References Cited

U.S. PATENT DOCUMENTS 4,758,470 A 7/1988 Koyama
4,819,742 A 4/1989 Driggers
(Continued)

FOREIGN PATENT DOCUMENTS

DE 10348973 A1 * 5/2005 .............. B25F 5/006
DE 102007005067 A1 * 7/2008 ........... A01D 34/824
(Continued)

OTHER PUBLICATIONS

U.S. Appl. No. 17/132,370 to Teraoka et al., which was filed on Dec. 23, 2020.
(Continued)

*Primary Examiner* — Paul N Dickson
*Assistant Examiner* — Matthew D Lee
(74) *Attorney, Agent, or Firm* — Greenblum & Bernstein, P.L.C.

(57) ABSTRACT

A work vehicle including a vehicle body, a pair of left and right driving wheels that movably support the vehicle body, a pair of motors capable of rotatably driving the left and right driving wheels respectively, a pair of maneuvering levers pivotally supported to the vehicle body to be pivotable about a horizontal axis extending in a vehicle body transverse direction and capable of adjusting rotational speeds of the left and right driving wheels respectively, and a pair of solid dynamic vibration absorbing portions supported to respective free end portions of the maneuvering levers and capable of suppressing vibrations of the maneuvering levers, wherein each solid dynamic vibration absorbing portion of the pair of solid dynamic vibration absorbing portions includes a weight within an elastic body, wherein the weight and the elastic body have equal longitudinal lengths.

6 Claims, 3 Drawing Sheets

(56) References Cited

U.S. PATENT DOCUMENTS

| | | |
|---|---|---|
| 5,704,259 A | 1/1998 | Riehle |
| 8,342,489 B1 | 1/2013 | Richardson et al. |
| 2008/0223593 A1 | 9/2008 | Eicher et al. |
| 2009/0038818 A1 | 2/2009 | Eicher et al. |
| 2009/0064829 A1 | 3/2009 | Frank et al. |
| 2011/0018223 A1* | 1/2011 | McPherson ............ F16F 7/108 |
| | | 280/281.1 |
| 2012/0012141 A1 | 1/2012 | Pietrzak et al. |
| 2012/0304805 A1 | 12/2012 | Higashijima et al. |
| 2014/0053371 A1 | 2/2014 | Feinstein |
| 2014/0110182 A1 | 4/2014 | Dwyer |
| 2016/0057924 A1* | 3/2016 | Asahara ................ A01D 34/64 |
| | | 180/312 |
| 2016/0075007 A1 | 3/2016 | Kutsuna et al. |
| 2019/0016214 A1 | 1/2019 | Melone et al. |

FOREIGN PATENT DOCUMENTS

| | | | | |
|---|---|---|---|---|
| EP | 0156387 A2 * | 10/1985 | | |
| EP | 2018937 A2 * | 1/2009 | ........... | B25D 17/043 |
| JP | H0576621 A | 3/1993 | | |
| WO | 2016161350 | 10/2016 | | |
| WO | WO-2016161350 A1 * | 10/2016 | .............. | B62J 25/00 |

OTHER PUBLICATIONS

Yamagishi, Shock Vibration Absorption Member and Grip End of Sport Implement Composed by Using it, Grip End of Tool and Grip End of Two-Wheeled Vehicle, Mar. 30, 1993, EPO, JP H0576621 A, Machine Translation of Description (1993).

\* cited by examiner

WORK VEHICLE

CROSS-REFERENCE TO RELATED APPLICATION

This is a continuation of U.S. patent application Ser. No. 16/430,880, filed on Jun. 4, 2019. The disclosure of the above-mentioned application, including the specification, drawings, and claims, is expressly incorporated herein by reference in its entirety.

BACKGROUND OF THE INVENTION

Field of the Invention

When a work vehicle is employed for a work such as a grass mowing work for instance, the work often takes a prolonged period of time, so riding comfort and superiority/inferiority of operability of the work vehicle significantly affects the fatigue or discomfort of its riding person. For this reason, many of recent work vehicles, as shown in e.g. US 2019/0016214A1, are equipped with a suspension or a vibration absorbing mechanism, thus alleviating the riding person's fatigue or discomfort through reduction of vibration.

Incidentally, with many work vehicles, a steering operation of wheels is effected by a pair of right and left maneuvering levers. Vibrations due to rotation of an engine, an electric motor, a mowing blade, of the vehicle body tends to be transmitted to such maneuvering levers. And, means for reducing vibrations, in a known arrangement, a sponge member formed of e.g. ethylene propylene rubber, etc. is wound around the grip portion of the maneuvering lever.

SUMMARY OF THE INVENTION

However, if sympathetic vibration occurs in the maneuvering lever due to vibration of the vehicle body, this can lead to increase of vibration of its free end portion. In addition, in the case of an arrangement in which the grip portion is provided at the free end portion of the maneuvering lever, even with presence of the sponge member at this grip portion, the vibration of the grip portion may not be suppressed favorably. In view of this state of the art, an object of the present invention is to provide a work vehicle in which vibration of the grip portion is effectively suppressed.

A work vehicle according to the present invention comprises:
  a vehicle body;
  a pair of left and right driving wheels that movably support the vehicle body;
  a pair of motors (prime movers) capable of rotatably driving the left and right driving wheels respectively;
  a pair of maneuvering levers pivotally supported to the vehicle body to be pivotable about a horizontal axis extending in a vehicle body transverse direction and capable of adjusting rotational speeds of the left and right driving wheels respectively; and
  a pair of dynamic vibration absorbing portions supported to respective free end portions of the maneuvering levers and capable of suppressing vibrations of the maneuvering levers.

With the present invention, dynamic vibration absorbing portions are supported to each free end portion of the pair of left and right maneuvering levers respectively. In general, if the dynamic vibration absorbing portion has a natural frequency same as a resonance frequency of the maneuvering lever, this dynamic vibration absorbing portion will vibrate in the reverse (opposite) phase relative to the vibration of the maneuvering lever, so that the vibration of the maneuvering lever can be readily absorbed by this dynamic vibration absorbing portion. Therefore, even when sympathetic vibration occurs in the maneuvering lever due to vibration of the vehicle body, vibration of the free end portion of the maneuvering lever can be reduced effectively. For this reason, even when the riding person keeps gripping the maneuvering lever for a prolonged period of time, fatigue or discomfort for this driving person can be alleviated. Consequently, there is realized a work vehicle in which vibration of the grip portion is effectively suppressed.

Preferably, in the above-described arrangement:
  at the free end portion of the maneuvering lever, there is provided a grip for a person riding the work vehicle to effect an operation of adjusting a rotational speed of the motor; and
  the dynamic vibration absorbing portion is supported on more free end side than the grip.

With the above-described arrangement, since the dynamic vibration absorbing portion is supported on more free end side than the grip, the dynamic vibration absorbing portion can readily absorb the vibration of the grip. Namely, vibration damping is realized with a simple arrangement.

Preferably, in the above-described arrangement:
  the dynamic vibration absorbing portion includes an elastic body and a weight; and
  of the dynamic vibration absorbing portion, the elastic body is supported to the free end portion of the maneuvering lever.

With the above-described arrangement, thanks to the arrangement of the elastic body being supported to the free end portion of the maneuvering lever, this elastic body serves as a spring or a damper between the weight and the free end portion of the maneuvering lever. Also, with the above arrangement, based on the weight of the weight and/or the material/shape of the elastic body chosen, it becomes possible to adjust the natural frequency of the dynamic vibration absorbing portion. Thus, through the simple arrangement of the weight and the elastic body, vibration of the free end portion of the maneuvering lever can be suppressed advantageously.

In the above-described arrangement, preferably:
  the elastic body, at its center portion in the longitudinal direction, is formed like a hollow cylinder; and
  the weight is engaged within the hollow center portion of the elastic body.

With the above arrangement, as the weight is engaged within the hollow center portion of the elastic body, the weight is supported to the elastic body. Thus, the supporting arrangement for the weight and the elastic body can be made simple and the supporting arrangement of the dynamic vibration absorbing portion to the free end portion of the maneuvering lever can be made simple also.

In the above-described arrangement, preferably:
  the free end portion of the maneuvering lever is formed like a hollow pipe; and
  the dynamic vibration absorbing portion is engaged within the hollow portion of the free end portion of the maneuvering lever.

With the above arrangement, there is realized the simple arrangement of the dynamic vibration absorbing portion being engaged within the hollow portion of the free end portion of the maneuvering lever.

In the above-described arrangement, preferably:
the dynamic vibration absorbing portion includes an elastic body and a weight;
the elastic body is formed like a hollow cylinder; and
the weight is engaged within a hollow center portion of the elastic body.

With the above arrangement, there is realized the simple arrangement of the elastic body being engaged within the pipe-like hollow portion at the free end portion of the maneuvering lever and the weight being engaged within the hollow portion of the elastic body.

DETAILED DESCRIPTION OF THE PREFERRED EMBODIMENTS

[Example of Work Vehicle]

Figure 1:
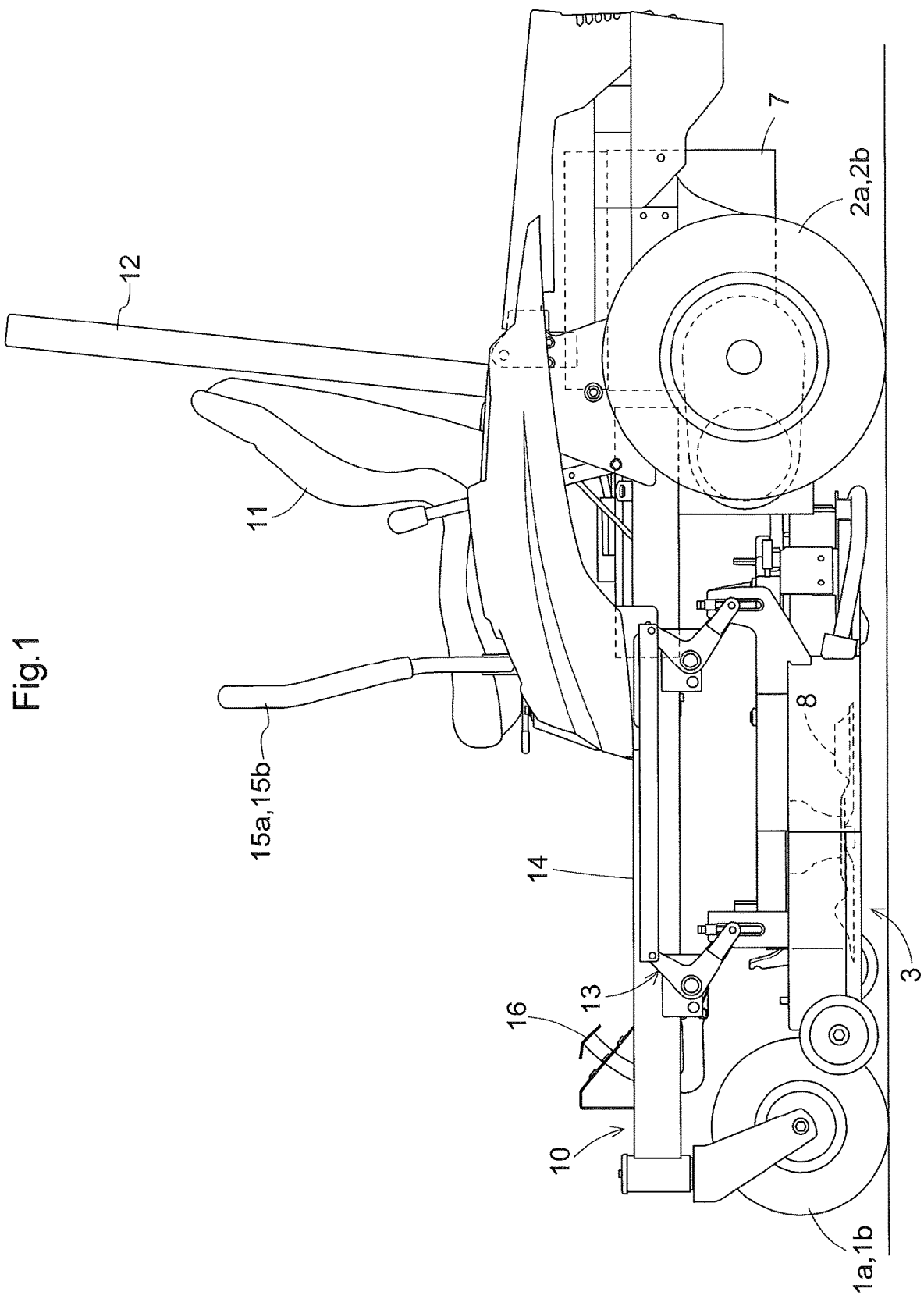
FIG. 1 is a left side view of a riding type lawnmower.
Figure 2:
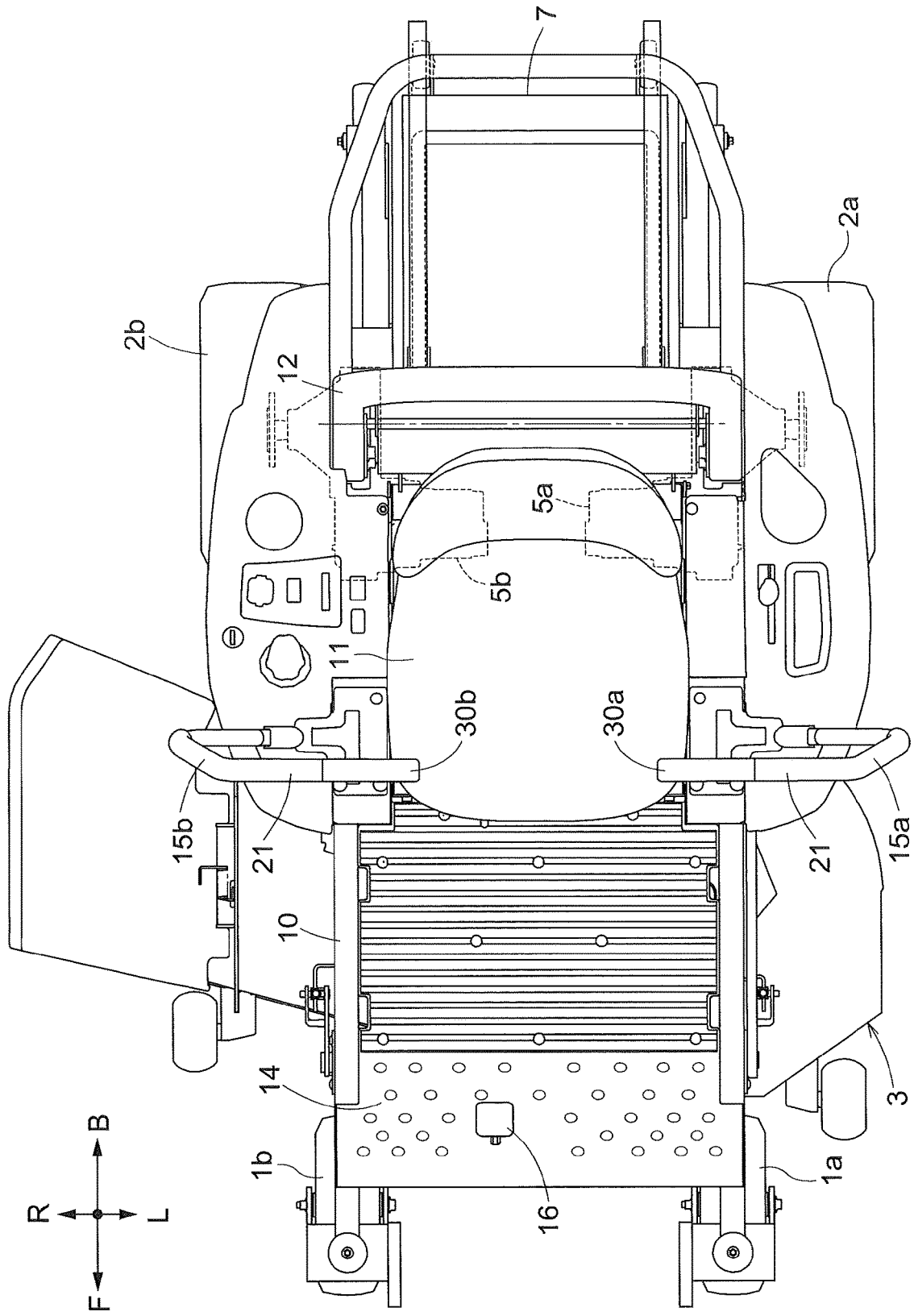
FIG. 2 is a plan view of the riding type lawnmower.

With reference to the accompanying drawings, a riding lawnmower as an example of the work vehicle relating to the present invention will be explained. FIG. 1 shows a left side view of the riding type lawnmower. FIG. 2 shows a plan view of the riding type lawnmower. Incidentally, in this detailed description, unless indicated otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

This riding lawnmower includes a vehicle body frame 10 as a vehicle body, a pair of left and right front wheels 1a, 1b, a pair of left and right driving wheels 2a, 2b, a battery 7, a driver's seat 11, and a ROPS frame 12. The pair of left and right driving wheels 2a, 2b and the pair of left and right front wheels 1a, 1b movably support the vehicle body, and the pair of left and right front wheels 1a, 1b are freely rotatable caster wheels. The pair of left and right driving wheels 2a, 2b are rotatably and independently driven by electric motors 5a, 5b respectively as a pair of left and right "motors" (prime movers). Though not shown, the vehicle body frame 10 is supported by the pair of left and right front wheels 1a, 1b and the pair of left and right driving wheels 2a, 2b via a suspension.

The battery 7 is disposed at a rear portion of the vehicle body frame 10 and the driver's seat 11 is disposed on more front side than the battery 7. The ROPS frame 12 is mounted erect on the vehicle body frame 10 upwardly from between the driver's seat 11 and the battery 7. Beneath the vehicle body frame 10 and at the space formed between the front wheels 1a, 1b and the driving wheels 2a, 2b, a mower unit 3 is mounted. This mower unit 3 is suspended from the vehicle body frame 10 to be lifted up/down via a lift link mechanism 13. The mower unit 3 is a side-discharge type and this mower unit 3 is provided with two rotary mowing blades 8, 8. Each one of the mowing blades 8, 8 is configured to be rotatably driven by a mower motor (not shown).

A floor plate 14 is formed on more front side than the driver's seat 11 and this floor plate 14 serves a "footrest" for a riding person (driver). From a front portion of the floor plate 14, a brake pedal 16 protrudes rearwardly upwards. On the left and right opposed sides of the driver's seat 11, there are disposed a pair of left and right maneuvering levers 15a, 15b. Each one of the pair of maneuvering levers 15a, 15b is supported to the vehicle body frame 10 to be pivotable about a horizontal axis in the vehicle body transverse direction and configured to be capable of adjusting a rotational speed of corresponding one of the pair of left and right electric motors 5a, 5b.

The riding person can adjust the rotational speed of the respective electric motor 5a, 5b by pivotally operating the respective left and right maneuvering levers 15a, 15b. Based on a pivoted angle of the left maneuvering lever 15a, an ECU will calculate a rotational speed of the left driving wheel 2a, namely, the rotational speed of the left electric motor 5a. Similarly, based on a pivoted angle of the right maneuvering lever 15b, the ECU will calculate a rotational speed of the right driving wheel 2b, namely, the rotational speed of the right electric motor 5b. When different power values are fed to the left and right electric motors 5a, 5b, the left driving wheel 2a and the right driving wheel 2b can be driven to rotate at different rotational speeds from each other. And, based on this speed difference between the left and right driving wheels 2a, 2b, a turning of the riding lawnmower is effected.

[Dynamic Vibration Absorbing Portion]

Figure 3:
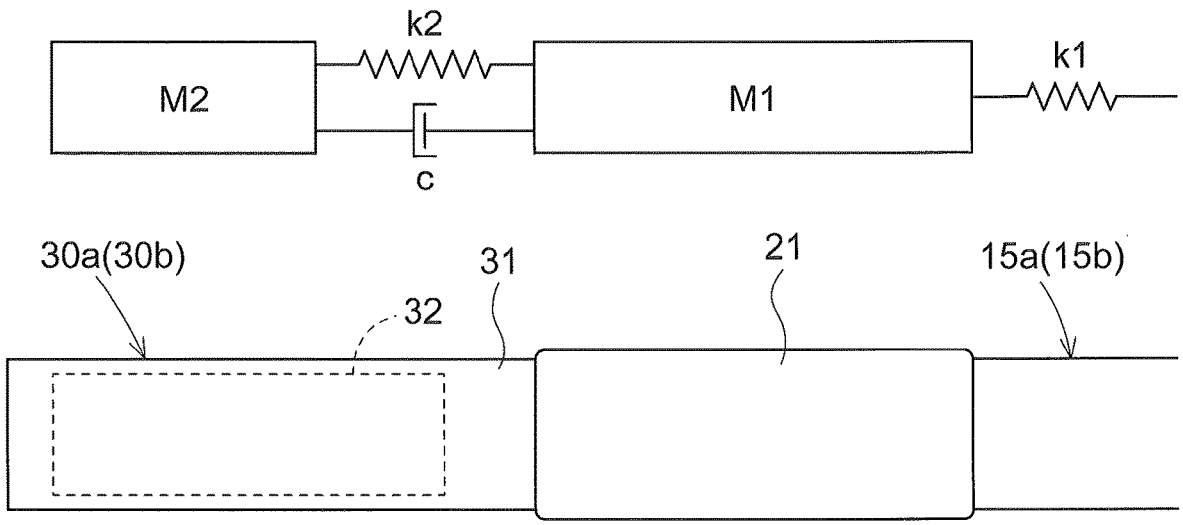
FIG. 3 is an explanatory view illustrating a supporting arrangement of a dynamic vibration absorbing portion to a free end portion of the maneuvering lever and a vibration model at the dynamic vibration absorbing portion.

As shown in FIG. 2 and FIG. 3, at the free end portions of the left and right maneuvering levers 15a, 15b respectively, a pair of dynamic vibration absorbing portions 30a, 30b are supported. The respective pair of left and right maneuvering levers 15a, 15b protrude upwards from their pivotal base end portions and upper end portions of the maneuvering levers 15a, 15b are bent inwards in the vehicle body transverse direction. Namely, the free end portions of the respective left and right maneuvering levers 15a, 15b extend along the vehicle body transverse direction. And, at these free end portions extending along the vehicle body transverse direction, grips 21, 21 are provided. Each grip 21, 21 is used for the riding person (driver) to effect an operation of adjusting the rotational speed of the respective electric motors 5a, 5b. The grip 21 is a sponge member formed of e.g. ethylene propylene rubber or the like, with the sponge member being wound around the free end portion of the maneuvering lever.

In operation, the riding person will grip the pair of left and right grips 21, 21 respectively and can pivot the left maneuvering lever 15a and the right maneuvering lever 15b respectively along the vehicle body front-rear direction. The left dynamic vibration absorbing portion 30a is supported at more free end side of the left maneuvering lever 15a than the grip 21. The right dynamic vibration absorbing portion 30b is supported at more free end side of the right maneuvering lever 15b than the grip 21. The dynamic vibration absorbing portions 30a, 30b respectively extends to the vehicle body transverse inner side on more free end side than the grip 21.

Each the dynamic vibration absorbing portion 30a, 30b respectively includes a rubber body 31 as "an elastic body" and a weight 32. The weight 32 is provided in the form of a solid cylindrical body and the rubber body 31 too is provided in the form of a cylindrical body. The weight 32 is made of a metal, but can be made of plastic, wood, rubber, etc. or can be made of a composite of these materials also. One end portion of the rubber body 31 in its longitudinal direction is formed like a solid cylinder and this one end portion is supported to the free end portion of the respective left and right maneuvering levers 15a, 15b. Namely, at the free end portion of the left maneuvering lever 15a, the one end portion of the solid cylinder of the rubber body 31 of the dynamic vibration absorbing portion 30a is supported. And, at the free end portion of the right maneuvering lever 15b, the one end portion of the solid cylinder of the rubber body 31 of the dynamic vibration absorbing portion 30b is supported. The longitudinal center portion of the rubber body 31 is formed as a hollow cylinder and the inside diameter of this hollow portion is equal to or slightly smaller than the outside diameter of the weight 32. The weight 32 is engaged within the longitudinal center portion of the rubber body 31, namely, its hollow portion.

FIG. 3 shows relationship between the maneuvering levers 15a, 15b and the dynamic vibration absorbing portions 30a, 30b in the form of a vibration model with two degrees of freedom. In the instant embodiment, the left and right maneuvering levers 15a, 15b respectively constitute the master vibration system, whereas the grip 21 corresponds to a weight body M1 of the master system. Of the respective left and right maneuvering levers 15a, 15b, its more base end side than the grip 21 corresponds to the master system spring k1 of the vibration model. Further, the respective dynamic vibration absorbing portions 30a, 30b constitutes the slave vibration system of the vibration model. The rubber body 31 corresponds to a spring k2 and a damper (c) in the slave vibration system and the weight 32 corresponds to the weight body M2 in the slave vibration system.

The weight of the weight 32, the spring constant of the spring k2 of the rubber body 31 and a damping coefficient of the damper (c) of the rubber body 31 together determine the natural frequency of the respective dynamic vibration absorbing portions 30a, 30b. For this reason, the weight of the weight 32, the spring constant and the damping coefficient of the rubber body 31 will be adjusted such that the natural frequency of the respective dynamic vibration absorbing portions 30a, 30b may agree with the resonance frequency of the respective left and right maneuvering levers 15a, 15b. With this arrangement, in the resonance frequency of the respective left and right maneuvering levers 15a, 15b, the respective dynamic vibration absorbing portions 30a, 30b will resonate in the reverse phase relative to the vibration of the maneuvering levers 15a, 15b. With this, the vibration of the grip 21 of the respective maneuvering levers 15a, 15b may be cancelled out each other, thus suppressing vibration of the grip 21, 21. In this way, the respective pair of the dynamic vibration absorbing portions 30a, 30b are configured to be supported to the free end portion of the respective maneuvering levers 15a, 15b and are capable of suppressing vibration of the respective maneuvering levers 15a, 15b. The spring constant and the damping coefficient of the rubber body 31 will be appropriately adjusted via choice of material and/or shape of the rubber body 31.

Figure 4:
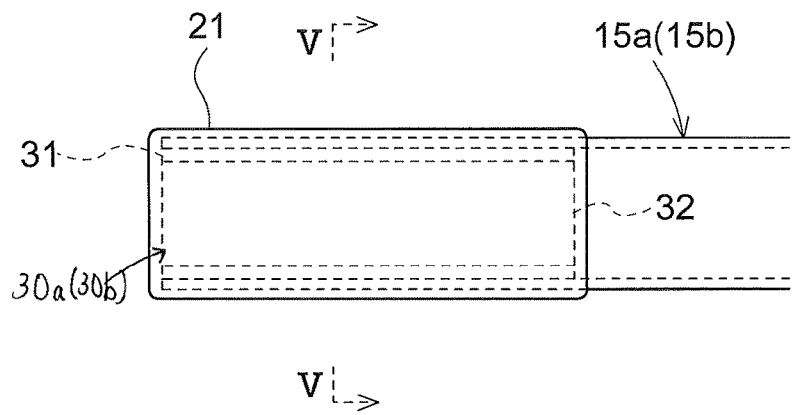
FIG. 4 is an explanatory view illustrating an arrangement of the dynamic vibration absorbing portion being engaged within the free end portion of the maneuvering lever.
Figure 5:
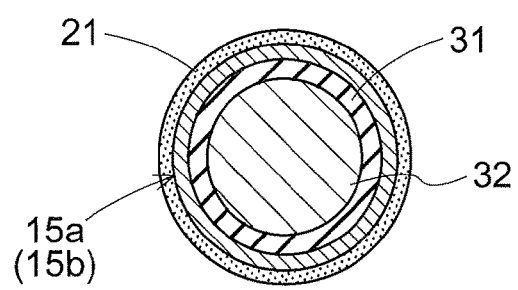
FIG. 5 is a section view taken along a line V-V in FIG. 4 showing the arrangement of the dynamic vibration absorbing portion being engaged within the free end portion of the maneuvering lever.

Further, as shown in FIG. 4 and FIG. 5, in case the free end portion of the respective maneuvering levers 15a, 15b is formed like a hollow pipe, the dynamic vibration absorbing portion 30a can be engaged within the maneuvering lever 15a and the dynamic vibration absorbing portion 30b can be engaged within the maneuvering lever 15b. FIG. 5 shows a section at the portion denoted by the line v-v in FIG. 4. The rubber body 31 is engaged within the maneuvering lever 15a. The rubber body 31 is also engaged within the maneuvering lever 15b. Like the arrangement described above with reference to FIG. 3, the rubber body 31 is formed like a hollow cylinder and the weight 32 is engaged within the hollow portion of the rubber body 31. The inside diameter of the hollow portion of the rubber body 31 is equal to or slightly smaller than the outside diameter of the weight 32.

To the arrangements of the rubber body 31 and the weight 32 shown in FIG. 4 and FIG. 5 also, the vibration model with two degrees of freedom shown in FIG. 3 is applicable. The respective left and right maneuvering levers 15a, 15b constitutes the master vibration system; and the maneuvering lever 15a, 15b and the grip 21 correspond to the master system weight body M1 in the vibration model. Of the respective left and right maneuvering levers 15a, 15b, the more base end side than the grip 21 corresponds to the master system spring k1 in the vibration model. The rubber body 31 corresponds to a spring k2 and a damper (c) in the slave vibration system. The weight 32 corresponds to the weight body M2 in the slave vibration system. In the respective dynamic vibration absorbing portions 30a, 30b shown in FIG. 4 too, the weight of the weights 32, 32, the spring constant and the damping coefficient of the rubber bodies 31, 31 will be adjusted such that the natural frequency of the respective dynamic vibration absorbing portions 30a, 30b may agree with the resonance frequency of the respective left and right maneuvering levers 15a, 15b.

Further Embodiments (1) In the foregoing embodiment, the electric motors 5a, 5b were shown as the motors (prime movers). These electric motors 5a, 5b can be replaced by engines respectively. Further alternatively, the pair of left and right motors can be combination of a single engine and a pair of left and right torque converters. Namely, it is possible to arrange such that a pair of left and right torque converters can distribute power from the signal engine independently to the pair of left and right driving wheels 2a, 2b and that torque transmission degrees by the pair of left and right torque converters are adjustable by the respective maneuvering levers 15a, 15b.

(2) In the foregoing embodiment, the pair of dynamic vibration absorbing portions 30a, 30b are supported on more free end side than the respective grips 21, 21. However, the arrangement is not limited thereto. For instance, the pair of dynamic vibration absorbing portions 30a, 30b can be supported to the respective free ends of the grips 21, 21 in the respective left and right maneuvering levers 15a, 15b or can be supported at the longitudinal center portions of the respective grips 21, 21.

(3) The dynamic vibration absorbing portions 30a, 30b respectively extend to the inner side of the vehicle body on more free end side than the grips 21, 21. The invention is not limited to this embodiment. For instance, the dynamic vibration absorbing portions 30a, 30b respectively can extend to the upper side of the vehicle body from the free end portions of the maneuvering levers or can extend to the lower side of the vehicle body from the free end portions of the maneuvering levers. Further alternatively, the dynamic vibration absorbing portions 30a, 30b respectively can extend progressively with an inclination to the lateral outer side of the vehicle body as they extend away from the free end portions of the maneuvering levers.

(4) In the foregoing embodiment, the pair of the dynamic vibration absorbing portions 30a, 30b respectively is provided with the rubber body 31 and the weight 32. The invention is not limited to this embodiment. For instance, the rubber body 31 can be replaced by a coil spring, a plate spring or the like formed of metal or plastic. Further, the rubber body 31 and the weight 32 can be provided as an integral body.

(5) In the foregoing embodiment, the weight 32 is engaged within the hollow portion of the rubber body 31. The invention is not limited to this embodiment. For instance, one left/right end portion of the rubber body 31 can be connected to the grip 21 and the other left/right end of the rubber body 31 can be connected to the weight 32.

(6) The work vehicle of this invention is not limited to the riding type lawnmower. The inventive work vehicle can be a fertilizer spreader vehicle or an insecticide or drug spreader vehicle or can even be a field transporter vehicle or a snow plow vehicle.

The invention claimed is:

1. A work vehicle comprising:
a vehicle body;
a pair of left and right driving wheels that movably support the vehicle body;
a pair of motors capable of rotatably driving the left and right driving wheels respectively;
a pair of maneuvering levers pivotally supported to the vehicle body to be pivotable about a horizontal axis extending in a vehicle body transverse direction and capable of adjusting rotational speeds of the left and right driving wheels respectively;
a pair of grips, each grip provided at a free end of the respective maneuvering lever; and
a pair of solid dynamic vibration absorbing portions supported to respective free end portions of the maneuvering levers and capable of suppressing vibrations of the maneuvering levers, wherein
each solid dynamic vibration absorbing portion of the pair of solid dynamic vibration absorbing portions includes a weight within an elastic body,
the weight and the elastic body have equal longitudinal lengths,
the elastic body has a hollow cylindrical shape that extends continuously in a longitudinal direction such that the elastic body is in continuous contact with the weight,
the grips do not extend to an endmost portion of each of the maneuvering levers,
the grips extend over an entire length of the respective solid dynamic vibration absorbing portion, and
each of the solid dynamic vibration absorbing portions is provided at a longitudinal center portion of each of the respective grips.

2. The work vehicle of claim 1, wherein:
longitudinal ends of the weight and the elastic body are aligned in a transverse direction.

3. The work vehicle of claim 1, wherein:
at the free end portion of the maneuvering lever, there is provided a grip for a person riding the work vehicle to effect an operation of adjusting a rotational speed of the respective motor; and
the dynamic vibration absorbing portion is entirely enclosed within the grip.

4. The work vehicle of claim 1, wherein:
the free end portion of the maneuvering lever is formed in a shape of a hollow pipe; and
the dynamic vibration absorbing portion is engaged within the hollow portion of the free end portion of the maneuvering lever.

5. The work vehicle of claim 4, wherein:
the weight is engaged within a hollow center portion of the elastic body.

6. The work vehicle of claim 1, wherein:
the elastic body has a spring constant and a damping coefficient, which are adjusted such that a natural frequency of the dynamic vibration absorbing portions correspond to a resonance frequency of the maneuvering levers.

* * * * *